Patented Nov. 25, 1930

1,782,796

UNITED STATES PATENT OFFICE

SAMUEL ISIDOOR VLES, OF ARNHEM, NETHERLANDS

PROCESS FOR THE PRODUCTION OF PARTIALLY-HYDROLYZED CELLULOSE ACETATES

No Drawing. Application filed October 25, 1927, Serial No. 228,696, and in the Netherlands July 20, 1927.

My invention relates to a process for the production of partially hydrolyzed cellulose acetates.

It is known that primary cellulose acetates prepared in the usual manner are, in general, slightly soluble in acetone and are to a small extent adapted to be dyed. In order to produce solutions of cellulose acetate in acetone which can be readily spun and which furnish silk of better dyeing properties, it has been proposed to partially saponify or hydrolyze the acetate. Thus for example, the cellulose acetate has been precipitated from the reaction mixture and this precipitate has been treated with inorganic acids or salts; or alternatively to the primary acetylation solution is added a controlled amount of water and if necessary sulphuric or other acids in order to effect the desired after saponification and hydrolysis, the mixture being maintained at an ordinary temperature or at a raised temperature.

From careful researches it appears that the viscosity of hydrolyzed acetates depends upon two factors, viz, on the decomposition of the cellulose molecule and on the degree of saponification or hydrolysis.

The present invention aims at prolonging the saponification or hydrolysis of cellulose acetate without decomposing the cellulose acetate molecule and thereby to retain or even increase the viscosity for the purpose of obtaining excellent cellulose acetate products in spite of prolonged hydrolysis.

According to the present invention cellulose triacetates in solution obtained in a known manner are hydrolyzed with a solution of sulphuric acid in water at a temperature of about 20° C., said hydrolyzing treatment being effected for such an extended period that the viscosity of the solution in acetone of the acetate separated out has exceeded the minimum viscosity and has reached a viscosity which is about 1½ times said minimum viscosity.

My invention will hereinafter be explained with reference to a specific example.

A mixture of 5 c. c. $H_2SO_4$ (specific gravity 1.84), 46 c. c. of water and 55 c. c. glacial acetic acid is added to a litre of a solution of cellulose-tri-acetate in glacial acetic acid containing 160 gr. of acetate.

The hydrolysis is carried out at 20° C. until the desired acetyl number is obtained and the solution in acetone of the acetate separated out has reached the aforementioned viscosity.

In order to show the great advantages obtained by my new process reference is made to the following two tables showing relative acetyl numbers and viscosity. Table 1, gives the figures obtained when the hydrolysis was carried out at a temperature of 50° C., whereas Table 2 gives the figures obtained when the hydrolysis is carried out at a temperature of 20° C. The first column of each table denotes the duration of the hydrolysis in hours; the second column the viscosity of the hydrolyzed solution; the third column the viscosity of a 15% solution in acetone of the product obtained by precipitation from the acetic acid solution; and the fourth column the acetyl number determined according to Ost. i. e. the percentage of acetic acid calculated on the dry cellulose acetate is given.

Table 1. (Temp. 50° C.)

| Duration of hydrolysis in hours | Viscosity of the acetic acid solution | Viscosity of the 15% solution in acetone | Acetyl number |
|---|---|---|---|
| 0 | 360 | Insoluble | 62.1 |
| 5 | 215 | 85 | 54.5 |
| 7 | 120 | 44 | 52.2 |
| 9 | 40 | 33 | 50.4 |
| 11 | 15 | 15 | 48.5 |
| 13 | 5 | No longer soluble. | 47.0 |

Table 2. (Temp. 20° C.)

| Duration of hydrolysis in hours | Viscosity of the acetic acid solution | Viscosity of the 15% solution in acetone | Acetyl number |
|---|---|---|---|
| 0 | 360 | Insoluble | 62.1 |
| 72 | 350 | 240 | 55.1 |
| 96 | 305 | 150 | 54.5 |
| 120 | 320 | 170 | 53.4 |
| 144 | 355 | 260 | 52.1 |

From Table 1, it can be seen that when the hydrolysis is carried out at 50° C., the viscosity of the hydrolyzing solution decreases greatly and that also the viscosity of a 15% solution of the precipitated cellulose acetate in acetone decreases. This is accompanied by a considerable and undesired decomposition of the cellulose molecule.

From Table 2, it can be seen that when the hydrolysis is carried out at 20° C., the viscosity of the hydrolyzing solution remains practically constant, and that the viscosity after reaching a minimum, rises to a considerable degree, which proves that no, or practically no, decomposition of the cellulose molecule takes place. It will also be seen from this table that the viscosity of the solution in acetone reaches a value of about 1½ times the minimum viscosity in more than five days and a little under six days.

It can thus be seen that my invention enables the acetyl number to be decreased without decomposing the cellulose molecule, and that it is moreover possible to increase the viscosity of the solutions in acetone.

I claim:

1. A process for the production of partly hydrolyzed cellulose acetate which comprises treating a solution of cellulose triacetate with diluted sulphuric acid at temperatures of about 20° C., for such a period that the viscosity of the solution in acetone of the acetate separated out has exceeded the minimum viscosity and has reached a viscosity which is about 1½ times said minimum viscosity.

2. A process for the production of partly hydrolyzed cellulose acetate which comprises treating a solution of cellulose triacetate with diluted sulphuric acid at temperatures of about 20° C., for a period of about 6 days.

3. A process for the production of partly hydrolyzed cellulose acetate which comprises treating a solution of cellulose triacetate with a mixture of sulphuric and acetic acids at temperatures of about 20° C., for such a period that the viscosity of the solution in acetone of the acetate separated out has exceeded the minimum viscosity and has reached a viscosity which is about 1½ times said minimum viscosity.

4. A process for the production of partly hydrolyzed cellulose acetate which comprises treating a solution of cellulose triacetate with a mixture of sulphuric and acetic acids at temperatures of about 20° C., for a period of about 6 days.

In testimony whereof I affix my signature.

SAMUEL ISIDOOR VLES.